(12) United States Patent
Veshchikov et al.

(10) Patent No.: US 12,299,313 B2
(45) Date of Patent: May 13, 2025

(54) METHOD FOR PROVING ERASURE OF A MEMORY

(71) Applicant: NXP B.V., Eindhoven (NL)

(72) Inventors: Nikita Veshchikov, Brussels (BE); Gareth Thomas Davies, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/457,472

(22) Filed: Aug. 29, 2023

(65) Prior Publication Data

US 2025/0077108 A1   Mar. 6, 2025

(51) Int. Cl.
   *G06F 3/06* (2006.01)

(52) U.S. Cl.
   CPC .......... *G06F 3/0652* (2013.01); *G06F 3/0604* (2013.01); *G06F 3/0679* (2013.01)

(58) Field of Classification Search
   CPC .... G06F 3/0604; G06F 3/0652; G06F 3/0679; G06F 21/00; H04L 9/00
   See application file for complete search history.

(56) References Cited

U.S. PATENT DOCUMENTS

| | | | |
|---|---|---|---|
| 8,098,530 B2 | 1/2012 | Sarin | |
| 9,733,864 B2 | 8/2017 | Moon et al. | |
| 2014/0101765 A1 | 4/2014 | Jakobsson et al. | |
| 2019/0036704 A1* | 1/2019 | DeVetter | H04L 9/14 |
| 2019/0392153 A1 | 12/2019 | Le Gargean et al. | |
| 2021/0405907 A1* | 12/2021 | Nagai | G06F 3/0652 |

FOREIGN PATENT DOCUMENTS

| | | |
|---|---|---|
| JP | 2012084198 A | 4/2012 |
| KR | 20010061510 A | 7/2001 |

OTHER PUBLICATIONS

A. Seshadri, A. Perrig, L. van Doorn and P. Khosla, "SWATT: softWare-based attestation for embedded devices," IEEE Symposium on Security and Privacy, 2004. Proceedings. 2004, Berkeley, CA, USA, 2004, pp. 272-282, (Year: 2014).*

Abusalah, Hamza, et al.; "Beyond Hellman's Time-Memory Trade-Offs with Applications to Proofs of Space"; Advances in Cryptology-ASIACRYPT 2017: 23rd International Conference on the Theory and Applications of Cryptology and Information Security, Hong Kong, China; Dec. 3-7, 2017.

(Continued)

*Primary Examiner* — Rocio Del Mar Perez-Velez
*Assistant Examiner* — Julian S Mendel
(74) *Attorney, Agent, or Firm* — Dan Hill (57) ABSTRACT

A method is described for proving erasure of a memory. In the method a prover device receives a seed value from a verifier device. The prover device generates a series of data blocks starting with the seed value and a function. The series of data blocks is generated using the function and the seed to generate a first data block of the series of data blocks. Each subsequent data block is generated using the function and a preceding data block until a last data block of the series of data blocks is generated and written to the memory portion. The prover device writes the series of data blocks to the memory to overwrite all memory contents of a memory portion of the prover device. After the data blocks are written to the memory by the prover device, the prover device sends notification of memory erasure to the verifier device.

11 Claims, 3 Drawing Sheets

(56) References Cited

OTHER PUBLICATIONS

Ammar, Mahmoud et al.; "SPEED: Secure Provable Erasure for Class-1 IoT Devices"; CODASPY '18: Proceedings of the Eighth ACM Conference on Data and Application Security and Privacy; Mar. 19-21, 2018, Tempe, Arizona; https://doi.org/10.1145/3176258.3176337.

Dziembowski, Stefan, et al.;. "Proofs of Space"; Advances in Cryptology—CRYPTO 2015: 35th Annual Cryptology Conference, Santa Barbara, CA, USA; Aug. 16-20, 2015.

Hao, Feng et al.; "Deleting Secret Data with Public Verifiability"; in IEEE Transactions on Dependable and Secure Computing; vol. 13, Issue 6; Nov.-Dec. 2016; DOI: 10.1109/TDSC.2015.2423684.

Karvelas, Nikolaos et al.; "Efficient Proofs of Secure Erasure"; Security and Cryptography for Networks, SCN 2014, Lecture Notes in Computer Science, vol. 8642; Springer, Cham. https://doi.org/10.1007/978-3-319-10879-7_30.

Perito, Daniele et al.; "Secure Code Update For Embedded Devices via Proofs of Secure Erasure"; Computer Security—ESORICS 2010: 15th European Symposium on Research in Computer Security, Athens, Greece; Sep. 20-22, 2010.

\* cited by examiner

| INDEX i | 5 | 18 | 43 | 78 |
|---|---|---|---|---|
| C VALUE GIVEN BY PROVER | C1 | C2 | C3 | C4 |

FIG. 6

METHOD FOR PROVING ERASURE OF A MEMORY

BACKGROUND

Field

This disclosure generally relates to memory, and more particularly, to a method for providing proof of erasure of the memory.

Related Art

Sometimes there is a need to erase sensitive data from a memory of an electronic device. For example, it may be desirable to erase sensitive data from a memory when the device is sold, disposed of, transferred, etc. In some cases the user of the device can trust the device to remove all its data or some specific data but this level of trust is often not possible. If the device does not belong to the user or if multiple vendors or manufacturers are involved in the system then the entity that requests the information to be removed from the device may not trust the device to remove the requested data.

When one device trusts another device, there is less need to prove that one device did what the other device requested. In the case where proof is needed, the prover device is the device requested to erase the memory content and the verifier device checks that the requested erasure was done.

One approach for a prover device to prove that its memory was erased involves the verifier device sending a data file that is sized to fill the entire memory of the prover device that is to be erased. When the data file is received by the prover device, the prover device sends the file back to the verifier device. For the prover device to send the data file back to the verifier device, the prover device first has to save the data file to memory, thus overwriting the contents of the memory and thereby erasing it. If the data file completely fills the memory then the data that was there before is now gone. This approach requires both writing data to memory and communicating data, which can be slow and consume a relatively large amount of power.

Therefore, what is needed is a method to prove erasure of a memory that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for providing proof of memory erasure. In the method, a prover device receives a seed value from a verifier device. The method uses an operation that is computationally efficient to compute and difficult to invert. That is, the method should be difficult to compute an input of a function for a given output. In the described embodiment, a cryptographic hash function is used but another type of operation such as public key encryption or white-box cryptography can be used. In some cases, stream ciphers that generate a keystream from a key can be used. In one embodiment of the method, the prover device writes a series of hashed data blocks to the memory to overwrite all memory contents of a memory portion of the prover device. A first hashed data block of the series of data blocks is generated using a hash function and the seed. Each subsequent hashed data block of the series of hashed data blocks is generated using the hash function and a preceding hashed data block until a last hashed data block is generated and written to the memory portion. After the last hashed data block is written to the memory, a notification of memory erasure is sent to the verifier device. Also, the verifier device may measure a time between sending the seed value to the prover device and receiving the notification from the prover device. The measured time may then be compared with a time threshold to determine if all the memory contents of the memory portion of the prover device were overwritten. The method for proving memory erasure saves bandwidth and requires less data be communicated between the prover and verifier devices.

In accordance with an embodiment, there is provided, a method for proving memory erasure, the method including: receiving, by a prover device, a seed value from a verifier device; generating a series of data blocks starting with the seed value and a function, wherein a first data block of the series of data blocks is generated using the function and the seed, and wherein each subsequent data block is generated using the function and a preceding data block until a last data block of the series of data blocks is generated and written to the memory portion; writing, by the prover device, the series of data blocks to the memory to overwrite all memory contents of a memory portion of the prover device; and sending a notification of memory erasure to the verifier device. Sending the notification may further include sending the last data block with the notification. The method may further include the verifier device measuring a time between sending the seed value to the prover device and receiving the notification from the prover device, and the verifier device comparing the measured time with a time threshold to determine if all the memory contents of the memory portion of the prover device were overwritten. The method may further include: requesting, by the verifier device, the prover device to provide a predetermined data block of the series of data blocks; responding to the request, by the prover device, by providing the predetermined hashed data block; comparing, by the verifier device, the predetermined data block provided by the prover device with the predetermined data block computed by the verifier to determine if they are the same; measuring, by the verifier device, a time between providing the request and receiving the predetermined data block; and comparing the measured time with a time threshold to determine if the predetermined data block was computed by the prover device or read from the memory by the prover device. The predetermined data block may be randomly selected by the verifier device. The requesting, responding, measuring, and comparing may be performed multiple times. The memory portion may be the entire memory. The method may further include: concatenating, by the prover device, the series of data blocks in a reverse order from the last data block to the first data block; computing, by the prover device, a hash of the concatenated series of data blocks in the reverse order using the hash function to produce a final hash value; and sending the final hash value to the verifier device. The function may be a cryptographic hash function. The memory may be a part of a secure element.

In another embodiment, there is provided, a non-transitory computer-readable storage medium storing instructions for causing a processor to perform operations including: receiving, by a prover device, a seed value from a verifier device; generating a series of data blocks starting with the seed value and a function, wherein a first data block of the series of data blocks is generated using the function and the seed, and wherein each subsequent data block is generated using the function and a preceding data block until a last data block of the series of data blocks is generated and written to the memory portion; writing, by the prover device, the series of data blocks to the memory to overwrite all memory contents of a memory portion of the prover device; and sending a notification of memory erasure to the verifier device. Sending the notification may further include sending the last data block with the notification. The non-transitory computer-readable medium may further include the verifier device measuring a time between sending the seed value to the prover device and receiving the notification from the prover device, and the verifier device comparing the measured time with a time threshold to determine if all the memory contents of the memory portion of the prover device were overwritten. The non-transitory computer-readable medium may further include: requesting, by the verifier device, the prover device to provide a predetermined data block of the series of data blocks; responding to the request, by the prover device, by providing the predetermined hashed data block; comparing, by the verifier device, the predetermined data block provided by the prover device with the predetermined data block computed by the verifier to determine if they are the same; measuring, by the verifier device, a time between providing the request and receiving the predetermined data block; and comparing the measured time with a time threshold to determine if the predetermined data block was computed by the prover device or read from the memory. The predetermined data block may be randomly selected by the verifier device. The requesting, responding, measuring, and comparing may be performed multiple times. The memory portion may be the entire memory. The non-transitory computer-readable storage medium may further include: concatenating, by the prover device, the series of data blocks in a reverse order from the last data block to the first data block; computing, by the prover device, a hash of the concatenated series of data blocks in the reverse order using the hash function to produce a final hash value; and sending the final hash value to the verifier device. The function may be a cryptographic hash function. The memory may be a part of a secure element.

Figure 1:
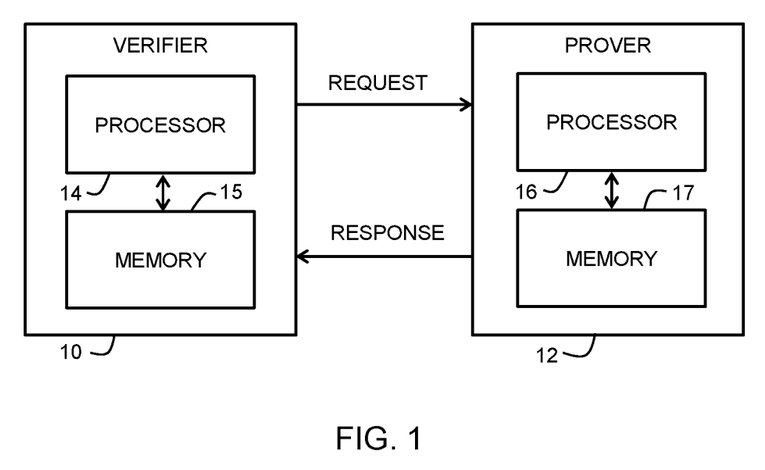
FIG. 1 illustrates, in block diagram form, a verifier device in communication with a prover device according to an embodiment.

FIG. 1 illustrates, in block diagram form, verifier device 10 in communication with prover device 12 according to an embodiment. Verifier device 10 may be any type of electronic device and includes processor 14 and memory 15. Verifier device 10 and prover device 12 may be implemented using one or more integrated circuits. Prover device 12 may be any type of electronic device and includes processor 16 and memory 17. Both verifier device 10 and prover device 12 may have other components not shown in FIG. 1. In one embodiment, the system as a whole is known to both devices and in particular both devices know the size of the memory to be erased by potential prover devices. In verifier device 10, processor 14 may include one or more of any type of processing element, a processor core, microprocessor, microcontroller, field-programmable gate arrays (FPGAs), application-specific integrated circuits (ASICs), digital signal processor, and the like. There can be any number of processors. Processor 14 may be a secure processor. Memory 15 is bi-directionally connected to processor 14. Verifier device 10 may include other circuits besides processor 14 and memory 15. Memory 15 can be one or more of any type of volatile or non-volatile memory. Examples of memory types include non-volatile memories such as flash, EEPROM (electrically erasable programmable read only memory), and the like. Volatile memory types include static random-access memory (SRAM) and dynamic random-access memory (DRAM). The memory may be used for storing instructions and/or data. Some or all of the memory 26 may be a secure non-volatile memory in a secure element. In prover device 11, processor 16 may include one or more of any type of processing element, a processor core, microprocessor, microcontroller, field-programmable gate arrays (FPGAs), application-specific integrated circuits (ASICs), digital signal processor, and the like. There can be any number of processors. Processor 16 may be a secure processor. Memory 17 is bi-directionally connected to processor 16. Prover device 11 may include other circuits besides processor 16 and memory 17. Memory 17 can be one or more of any type of volatile or non-volatile memory. Examples of memory types include non-volatile memories such as flash, EEPROM (electrically erasable programmable read only memory), and the like. Volatile memory types include static random-access memory (SRAM) and dynamic random-access memory (DRAM). The memory may be used for storing instructions and/or data. Some or all of the memory 17 may be a secure non-volatile memory in a secure element.

In one embodiment, verifier device 10 and prover device 11 may be part of a system such as an internet of things (IoT) network, a system communicating via the internet, and other types of networks that exchange information between a plurality of devices. The plurality of devices, including verifier device 10 and prover device 11 may exchange the information with each other wirelessly over, for example, cellular, local area networks, Wi-fi, or Bluetooth, or using a wired connection such as ethernet. As an example, verifier device 10 sends a request (REQUEST) to prover device 11, such as, e.g., a request to erase a memory, and prover device provides a response to the request (RESPONSE). In another embodiment, verifier device 10 and prover device 11 may be part of the same device. For example, prover device 11 may be an embedded universal integrated circuit card (eUICC) in a smart phone and verifier device 10 may be a processor or application in the smartphone that communicates with the eUICC. In another embodiment, verifier device 10 and prover device 11 may be part of a different application or system.

Sometimes it can be useful to erase all contents from the memory of a device, for example, when the device is being decommissioned, when some unique credentials are being transferred and should be deleted or when the user of the device changes. The data may be sensitive or personal to the user. When one device trusts another device, there is no need to go through a proof that one device did what the other device requested. However, in some situations, one device may not fully trust another device. In the described example, prover device 11 is requested by verifier device 10 to erase all content from memory 17. After being notified by prover device 11 that the memory was erased, verifier device 10 checks that the requested erasure was done. To check that prover device 11 erased memory 17 as requested, in one embodiment, verifier device 10 needs to know the size of memory 17 and the memory size of any other potential prover devices in the system. In one embodiment, the memory being erased is a non-volatile memory such as flash memory.

Figure 2:
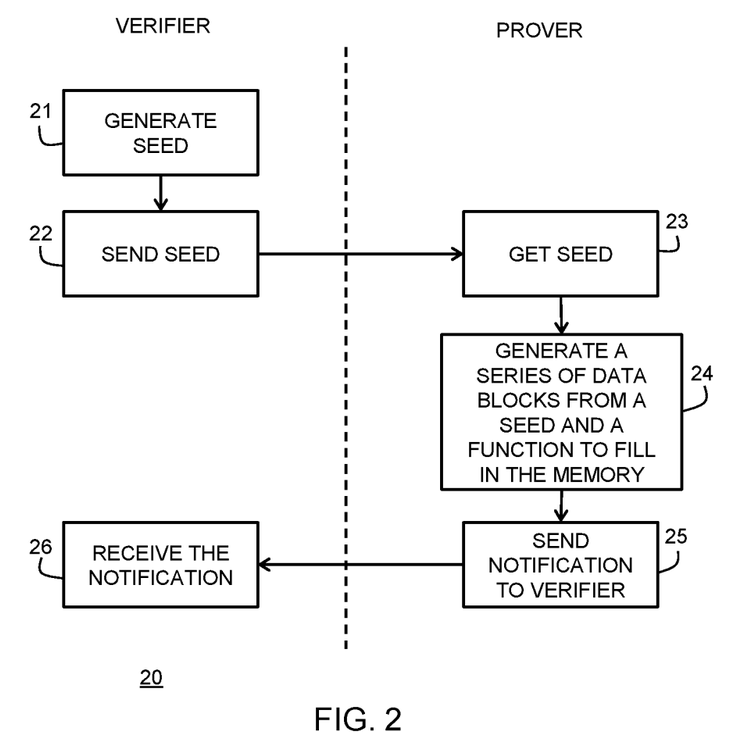
FIG. 2 illustrates, in block diagram form, a method for creating hashed data blocks from a seed value according to an embodiment.
Figure 3:
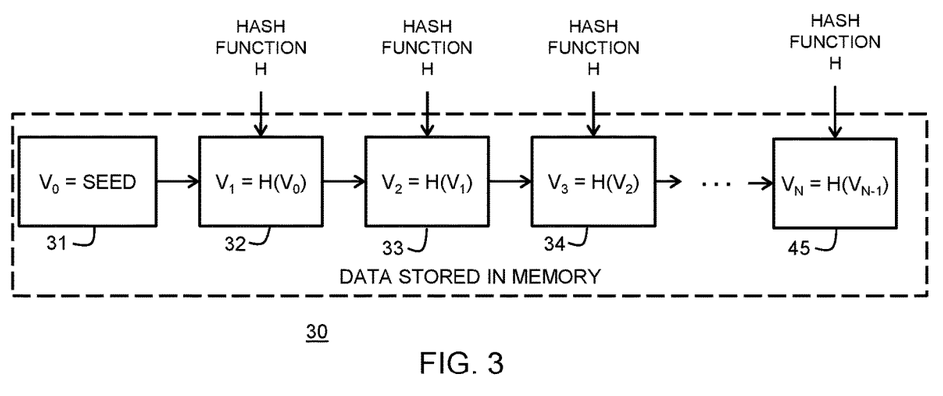
FIG. 3 illustrates a series of data blocks according to an embodiment.

FIG. 2 illustrates, in block diagram form, method 20 to create hashed data blocks from a seed value according to an embodiment. In the method, a relatively long data stream based on an initial seed value is generated and used to overwrite the contents of memory 17. The data stream is generated using the initial seed value and an operation or function that is computationally efficient to compute and difficult to invert. For example, in a computation of a data block having an arbitrary offset i determined from the first data block, the output should be difficult to derive without first computing all of the intermediate blocks between the first data block and the data block at the offset. One such operation or function is provided by a cryptographic hash function such as for example, SHA-2 and SHA-3, as shown in FIG. 3. Using the system of FIG. 1 as an example, the seed value as well as all the data blocks $V_i$ are to be stored in memory 17 of prover device 12 to overwrite the data stored in memory 17. A sufficient number of data blocks must be computed to completely fill memory 17 of prover device 12.

FIG. 2 shows steps performed by a verifier device on the left side of the vertical dashed line and steps performed by a prover device on the right side. The method starts at block 21 where a seed value is generated by the verifier device, e.g., verifier device 10 in FIG. 1. At block 22, the seed value is sent to the prover device by the verifier device. At block 23, the prover device receives the seed value. At block 24, the prover device generates a chain or series of data blocks using the seed and a function, such as a hash function. The size and number of generated data blocks is determined to fill the memory space that is to be overwritten (erased). In one embodiment, the function is a cryptographic hash function. Also, in one embodiment, the memory to be overwritten is the entire memory of the prover device. In another embodiment, the memory to be overwritten is less than the entire memory, e.g., a memory portion of a eUICC that stores a profile of a network operator. After the memory is erased, at block 25, the prover device sends a notification that the memory has been erased. At block 26, the verifier device receives the notification.

The notification that is sent from the prover device to the verifier device at block 25 can be a simple, "computation is finished" message, or it can also include one of the data blocks, such as the last data block to be computed. The verifier device can also measure the time between sending the seed value and receiving the notification that the computation is done. This may give the verifier device a more accurate estimation of the time needed for the computation of one data block by the prover device, e.g., one computation of a hash function. Given knowledge of the specifications of the prover device, the verifier device should be able to estimate relatively closely the calculation time for the prover device to compute the data block that is sent with the notification. Transmission of the data block sent with the notification allows the verifier device to check the actual transmission time against an expected transmission time as one way to verify that the memory was actually erased as requested.

FIG. 3 illustrates method 30 for generating a series of data blocks 31-45 according to an embodiment. A first data block 31 includes the seed value $V_0$. Seed value $V_0$ and hash function H is used to compute data block 32 as $V_1=H(V_0)$. The hash function H may be, e.g., one of SHA-2 or SHA-3. Data block 32 and hash function H is then used to compute data block 33 as $V_2=H(V_1)$. Data block 33 and hash function H is then used to compute data block 34 as $V_3=H(V_2)$. Data blocks of the series of data blocks are computed until a last data block $V_N=H(V_{N-1})$ is computed. Value N is determined to provide enough data blocks to fill the memory to be erased. The data blocks are then used to overwrite data stored in the memory.

Figure 4:
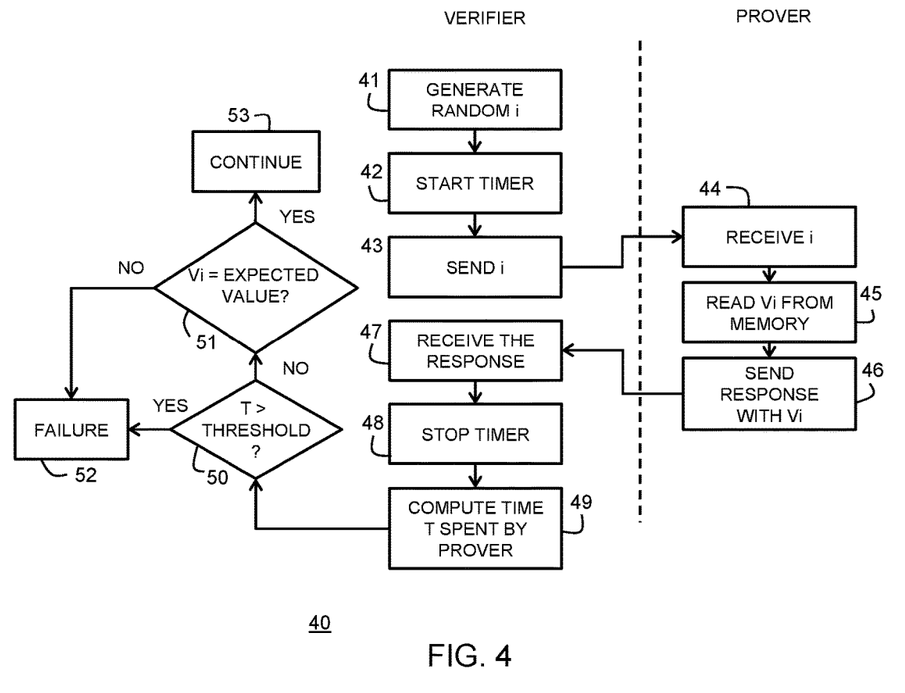
FIG. 4 illustrates a method for proving and verifying memory erasure according to an embodiment.

FIG. 4 illustrates method 40 for proving and verifying memory erasure according to an embodiment. Once notification is received by the verifier device, the verifier device and the prover device may enter a query phase. Method 40 follows receipt of the notification by the verifier device in block 26 of FIG. 2. Steps to be performed by the verifier device are on the left side of the dashed line, and steps to be performed by the prover device are on the right side of the dashed line. Method 40 begins at block 41. At block 41, a random index value i is generated. The index value i can be any number between 1 and N and corresponds to a data block as shown in FIG. 3. At block 42, the verifier device starts a timer. At block 43, the index i is sent to the prover device. At block 44, the prover device receives the index i. and at block 45, the prover device is supposed to read the corresponding data block from memory. Reading the data block is typically faster than computing it from an algorithm such as a hash function. At block 46, a response including the retrieved data block is sent to the verifier device. At block 47, the response and data block are received by the verifier device. At block 48, the timer is stopped. At block 49, a time T between sending index i and receiving the data block is computed by the verifier device. At decision block 50, time T is compared to a precomputed threshold time. Generally, computation of a data block depends on the data blocks previously computed, thus, computing the data block corresponding to index i requires that all preceding data blocks, if any, first be computed. For example, referring to FIG. 3, if index i equals 3, corresponding to data block 34, then data blocks 32 and 33 are first computed so that data block 34 can be computed. Therefore, the threshold is chosen to indicate if the data block was retrieved from memory or computed. If at decision block 50, time T is greater than the threshold, the YES path is taken to block 52, where it is concluded that the prover device computed the data block rather than reading it from memory, and the memory erasure is not verified by the verifier device. If at decision block 50, the time T is less than or equal to the threshold, the NO path is taken to decision block 51, where the data block sent by the prover device is compared to the data block for the same index i computed by the verifier device. If the data block from the prover device is not as expected, then the verification fails at block 52. If the data block sent by the prover device equals the data block computed by the verifier device, then memory erasure is verified and the method proceeds to block 53. At block 53, it can be decided by the verifier device to end the verification or to return to block 41 and repeat method 40 for a different random index i. The query phase of method 40 may be repeated multiple times, the more times it is repeated the more certain the verifier can be that the prover device actually removed all the previous contents of its memory by overwriting it with the values $V_i$ generated from the seed.

Note that the values $V_i$ can be computed in the same way by the verifier device. The verifier device can either compute all of values $V_i$ in advance and perform method 40 after each query of the prover device, or the verifier device can make several queries and check the response time.

Figure 5:
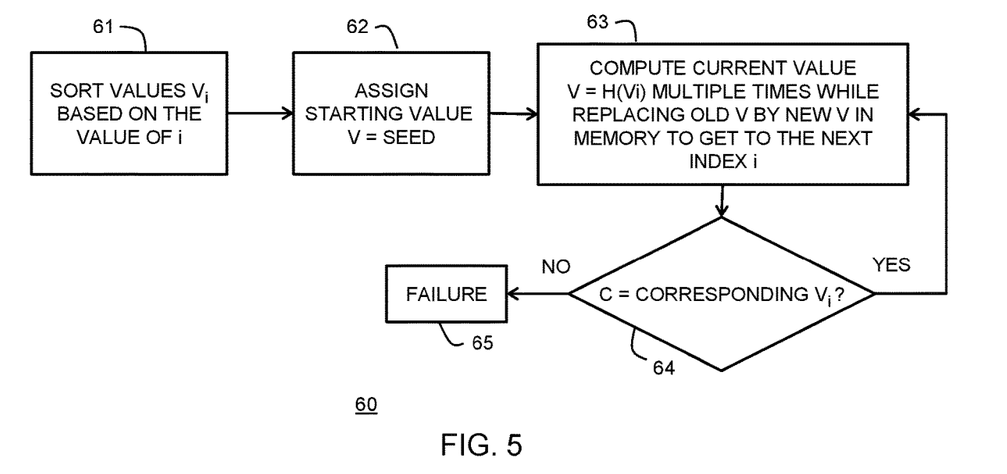
FIG. 5 illustrates a method for verifying memory erasure by a verifier device according to another embodiment.
Figure 6:
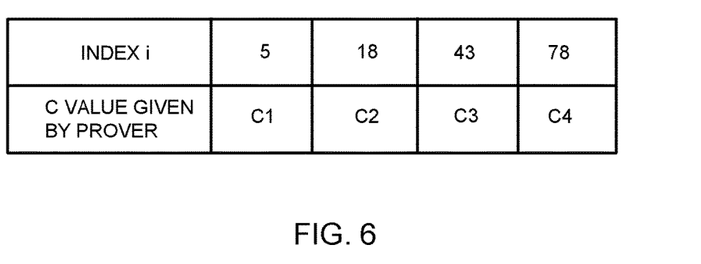
FIG. 6 illustrates a table of index values and corresponding data blocks for use in describing the method of FIG. 5 according to an embodiment.

FIG. 5 illustrates method 60 for verifying memory erasure by a verifier device according to an embodiment. Method 60 provides one way for the verifier device to avoid storing all $V_i$ values, which would require using the same amount of memory the prover device has been requested to erase. Using the method of FIG. 5, the verifier device can perform all checks of $V_i$ that were in the responses from the prover device during the queries of method 40 in FIG. 4, while performing all the computations "in place" using only enough memory for one data block $V_i$. As one example, data block values C, provided by the prover device, corresponding to index i provided by the verifier device are provided in the table of FIG. 6. A simplified algorithm for in-place computation with verification by the verifier device is provided by method 60 in FIG. 5. FIG. 6 illustrates a table of index values and corresponding hashed data blocks for use with the method of FIG. 5 as one example for discussion purposes. In this example, the indexes i provided by the verifier device to the prover device in method 40 are sorted by the verifier device from lowest to highest, at block 61. The verifier device starts from the data block equal to the seed value V at block 62, and computes the data block $V_5$ corresponding to index 5, at block 63, using the hash function H 5 times, and then storing the data block in memory. The verifier device compares data block $V_5$ to value C1 provided by the prover device at decision block 64. If value C1 from the prover device is not equal to the data block $V_5$, then the NO path is taken to block 65 and the verification fails. If the value C1 is equal to $V_5$, then the method returns to block 63, and the next data block $V_i$ from the table of FIG. 6 is computed. The next data block $V_i$ computation starts from data block $V_5$ and 13 more computations are performed using hash function H to compute index value $V_{18}$ (5+13=18). If the current value C2 provided by the prover device equals $V_{18}$, then the method proceeds with index 43. Data block $V_{43}$ is computed starting with data block $V_{18}$ and computing the hash value 25 more times (to get to 18+25=43). It is then determined if the value C3 provided by the prover device equals $V_{43}$, and so on.

In another embodiment, the verifier device can also pre-compute all values of $V_i$ without storing all the values while still having relatively fast access to them using a table with intermediate results (not shown). As an example, the intermediate values $V_0$ (seed), $V_{10}$, $V_{20}$, $V_{30}$, $V_{40}$, etc. to $V_{90}$ are stored for the case when the device had to compute values of data blocks until $V_{100}$. Then, when the verifier device checks the value of, e.g., $V_{42}$, the verifier device can retrieve the value $V_{40}$ and perform two computations of the function H on it to get $V_{42}$. In this example it would allow the verifier device to store 10 times less data but at the cost of up to 9 computations for a given verification, e.g., to compute $V_{29}$ starting from $V_{20}$.

In another embodiment, a reverse order hash computation may be performed. In this embodiment, a hash is computed over the hashed data values that were generated in FIG. 3 and used to overwrite the memory, except that they are used in reverse order. After the prover device is done computing the last data block $V_N$ as shown in FIG. 3, the prover device computes the hash function over all of the data blocks $V_i$ concatenated in a reverse order. For example, in the case when the prover has to compute up to data block $V_{100}$, the message to compute the hash over would be: $V_{100}|V_{99}|V_{98}|$ . . . $|V_3|V_2|V_1|V_0$ where the symbol "|" represents concatenation. Sending the last computed block ($V_{100}$ in this example) can provide the verifier device additional information on how much time the computation takes. The time when the last data block $V_{100}$ is computed should be approximately the midpoint (time-wise) for the entire computation. After the prover device computes the hash value of the concatenated reverse ordered data blocks, the prover device will send the last computed data block to the verifier device. The verifier device can check how much time it took the prover device to compute the hash value of the concatenated reverse ordered data blocks starting from the time the seed was sent to the prover device. If the prover device does not cheat, then it would take approximately 2*B*T, where B is the number of data blocks that are needed to fill the memory of the prover device and T is the amount of time that the prover needs to compute one hash function. The multiplication by two approximates the time required to compute the message plus transmission time in one direction, and the time required to compute the final hash value plus transmission time in the other direction. The verifier device then checks that the final value of the hash is correct, and the amount of time that it took the prover device to compute it matches a predetermined time as described above regarding the method of FIG. 4. If the prover device did the computation on time and the result is correct, then it is assumed the prover device did not cheat and filled in the entire memory with values $V_i$, thus overwriting the previous content of the memory. This approach may potentially save even more bandwidth over the verification method 60 in FIG. 5.

One straightforward approach for the prover device to try to trick the verifier device into concluding the memory was erased is to use a table with precomputed intermediate values of $V_i$ as described above. However, unless the verifier device asks about a data block $V_i$ where i is a multiple of 10 as in the table of the above example, then the cheating prover device would need more time to provide the requested data block because multiple hash functions would need to be computed.

A cheating prover device may try to store every second value in a series of hashes, thus only using half of its memory. For a prover device to provide a requested data block in this case would require at most one hash computation to answer a query. For a verifier device to detect that the prover device is computing data blocks instead of reading them from memory would require a more precise estimation of computation time for performing one hash computation to be able to distinguish a memory read of a data block from a computation of the data block.

Overall, if the time constraints applied by the verifier device are accurate enough, then the verifier device will be able to consistently detect when a prover device is cheating. In the case of the reverse order hash computation discussed above, the verifier device should know as precisely as possible how much time it takes for the prover device to perform one computation of the hash function.

In addition, for the verification procedure, the verifier device can check the last data block and the first data block of the series of data blocks computed by the prover device. Also, the verifier device should have a good source of randomness so the prover device would not be able to predict the indices that the verifier device will request in the query phase. To avoid a situation in which the prover device is cheating by storing only every Kth item, the verifier device should ensure that all the queries do not share a common divider to minimize a likelihood the prover device gets lucky with the queries.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. The terms "circuit" and "circuitry" may refer to hardware, software, or a combination of hardware and software.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method for proving memory erasure by a prover device, the method comprising:
   receiving, by processing circuitry of a prover device, a seed value from a verifier device;
   generating, by the processing circuitry of the prover device, a series of data blocks starting with the seed value and a function, wherein a first data block of the series of data blocks is generated using the function and the seed, and wherein each subsequent data block is generated using the function and a preceding data block until a last data block of the series of data blocks is generated and written to a memory portion of a memory coupled to the processing circuitry of the prover device;
   writing, by the processing circuitry of the prover device, the series of data blocks to the memory of the prover device to overwrite all memory contents of the memory portion of the prover device; and
   sending a notification of memory erasure to the verifier device;
   sending a request to the prover device, by the verifier device, instructing the prover device to provide a predetermined data block of the series of data blocks;
   responding to the request, by the prover device, by transmitting a transmitted data block to the verifier device as the predetermined data block;
   comparing, by the verifier device, a value of the transmitted data block provided by the prover device with a value of the predetermined data block determined by the verifier to determine if they are the same;
   measuring, by the verifier device, a time between providing the request to the prover device and receiving the transmitted data block; and
   comparing the measured time with a time threshold to determine if the value of the transmitted data block was computed by the prover device or read from the memory by the prover device.

2. The method of claim 1, wherein sending the notification further comprises sending the last data block with the notification.

3. The method of claim 1, wherein the predetermined data block is randomly selected by the verifier device.

4. The method of claim 1, wherein the requesting, responding, measuring, and comparing are performed multiple times.

5. The method of claim 1, wherein the memory portion is the entire memory.

6. The method of claim 1, further comprising:
   concatenating, by the prover device, the series of data blocks in a reverse order from the last data block to the first data block;
   computing, by the prover device, a hash of the concatenated series of data blocks in the reverse order using the function to produce a final hash value; and
   sending the final hash value to the verifier device as the transmitted data block.

7. The method of claim 1, wherein the function is a cryptographic hash function.

8. The method of claim 1, wherein the memory is a part of a secure element.

9. A method for proving memory erasure by a prover device, the method comprising:
   receiving, by processing circuitry of a prover device, a seed value from a verifier device;
   generating, by the processing circuitry of the prover device, a series of data blocks starting with the seed value and a function, wherein a first data block of the series of data blocks is generated using the function and the seed, and wherein each subsequent data block is generated using the function and a preceding data block until a last data block of the series of data blocks is generated and written to a memory portion of a memory coupled to the processing circuitry of the prover device;
   writing, by the processing circuitry of the prover device, the series of data blocks to the memory of the prover device to overwrite all memory contents of the memory portion of the prover device;
   the prover device sending a notification of memory erasure to the verifier device; and
   the verifier device measuring a time between sending the seed value to the prover device and receiving the notification from the prover device, and the verifier device comparing the measured time with a time threshold to determine if all the memory contents of the memory portion of the prover device were overwritten.

10. A system comprising a verifier device having processing circuitry that is configured to:
- send a request to a prover device instructing the prover device to erase data stored in a memory portion of a memory coupled to the prover device;
- send a seed value to the prover device;
- send a request to the prover device instructing the prover device to provide a predetermined data block of the memory portion;
- receive a transmitted data block sent by the prover device in response to the request to the prover device instructing the prover device to provide the predetermined data block;
- compare a value of the transmitted data block provided by the prover device with a value of the predetermined data block determined by the verifier to determine if they are the same;
- measure a time between providing the request to the prover device instructing the prover device to provide the predetermined data block and receiving the transmitted data block; and
- compare the measured time with a time threshold to determine if the value of the transmitted data block was computed by the prover device or read from the memory by the prover device.

11. The system of claim 10, further comprising the prover device, wherein the prover device comprises processing circuitry configured to:
- receive, from the verifier device:
  - the request instructing the prover device to erase data stored in the memory portion of the memory coupled to the prover device;
  - the seed value; and
  - the request instructing the prover device to provide the predetermined data block of the memory portion;
- generate a series of data blocks starting with the seed value and a function, wherein a first data block of the series of data blocks is generated using the function and the seed, and wherein each subsequent data block is generated using the function and a preceding data block until a last data block of the series of data blocks is generated and written to the memory portion of the memory coupled to the processing circuitry of the prover device;
- write the series of data blocks to the memory coupled to the prover device to overwrite all memory contents of the memory portion;
- send a notification of memory erasure to the verifier device; and
- respond to the request instructing the prover device to provide the predetermined data block of the series of data blocks by providing the transmitted data block as the predetermined data block to the verifier device.

* * * * *